Nov. 7, 1961 — A. E. LINDSTROM — 3,007,582
WINDOW RACK
Filed Feb. 8, 1960
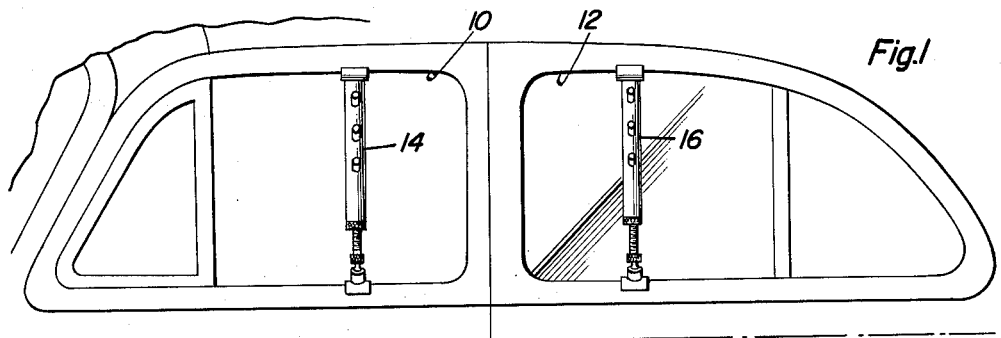
Fig.1
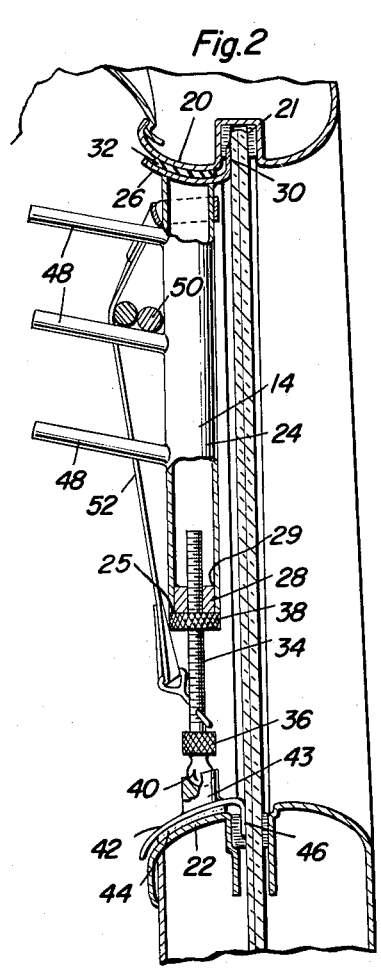
Fig.2
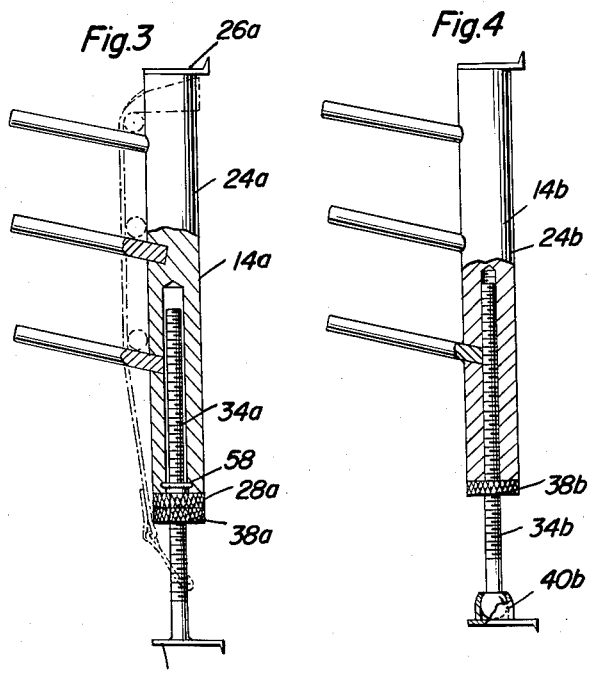
Fig.3
Fig.4
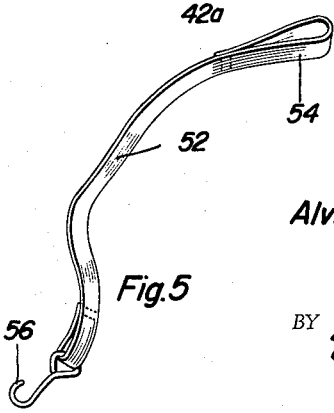
Fig.5
Alvin E. Lindstrom
INVENTOR.
BY *Clarence A. O'Brien*
*and Harvey B. Jacobson*
Attorneys United States Patent Office 3,007,582
Patented Nov. 7, 1961

3,007,582
WINDOW RACK
Alvin E. Lindstrom, 23 Edwards Drive, Silver Bay, Minn., assignor of fifty percent to Lois E. Oelke, Stewartville, Minn.
Filed Feb. 8, 1960, Ser. No. 7,239
2 Claims. (Cl. 211—87)

This invention relates to racks, and more particularly to a rack adapted to be used on a motor vehicle, regardless of the nature of the motor vehicle.

An object of the invention is to provide a mechanically simple rack to facilitate carrying elongate objects on a motor vehicle, for instance, an automobile or truck.

Briefly, the invention is embodied in a rack composed of two identical rack units which are extensibly adjustable to fit between two structural members of a motor vehicle. An ideal location for the rack units would be vertically across the space between the upper and lower sills of the motor vehicle window.

Each unit is preferably made of a tube with an adjusting member therein, for instance, a screw, so that the unit may be tightened by extending the screw and tube with respect to each other and binding the ends of the unit against the upper and lower sills. For convenience, pegs protrude laterally outwardly from the main body of each unit so that elongate objects may be rested thereon and held in place by means of a strap.

Although the variety of objects which may be carried by the rack are numerous, typical objects would be fishing rods or poles, firearms, spears, bows, miscellaneous wooden, plastic and metal elongate objects such as would be purchased at a hardware store, etc.

An important feature of the invention is found in the fact that the rack is detachable from the vehicle without in any way disfiguring the finish of the vehicle. Accordingly, when the rack is not in use, it may be removed and placed in a convenient location, for instance, the storage compartment of a motor vehicle where it is completely out of sight.

Another feature of the invention is found in the ease and facility with which the rack units may be attached and detached. This is of commercial significance, making the rack a desirable, practical device.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a motor vehicle equipped with a rack in accordance with the invention;

FIGURE 2 is a vertical sectional view showing one of the racks in place within the suggested sills of the window in FIGURE 1;

FIGURE 3 is an elevational view of a modification of the rack, parts broken away in section to illustrate otherwise obscure details;

FIGURE 4 is a view similar to FIGURE 3 but showing a further modification;

FIGURE 5 is a perspective view of a strap which may be used in conjunction with the rack.

In the accompanying drawings, there is an illustration of two windows 10 and 12 of a motor vehicle. There are two rack units 14 and 16 disposed in the windows or openings 10 and 12, and the rack units are identical in construction. FIGURE 1 discloses a suggested use of the rack which would include a pair of rack units extending vertically between the upper and lower walls or sills 20 and 22 (FIGURE 2) of the windows.

Typical rack unit 14 is shown in detail in FIGURE 2. This rack is made of a tubular body 24 having a curved upper plate or head 26 fixed to the upper end thereof, and having a nut 28 fixed, for instance, by spot welding 29, in the lower or otherwise open end 25 of the tubular body 24. The curvature of plate 26 matches the curvature of upper sill 20, and there is a flat projection 30 formed along one edge of the plate 26, and the projection fits within the window slot 21 of sill 20. A resilient pad 32, which may be made of rubber or any suitable material including felt, is adhered to the outer surface of plate 26 so that the finish of sill 20 will not be damaged when the rack unit is installed.

An extensible member, for example, screw 34 is threaded in the tapped opening of nut 28. A knurled cylindrical head or section 36 of the shank of screw 34 is used to facilitate turning of the screw in nut 28. A locknut 38 is on the screw 34 and bears against the fixed nut 28 to lock the screw 34 in a selected adjusted position.

A ball 40 is formed at the lower end of the screw 34, and seats in an upstanding socket-type bearing 43 on a foot or plate 42 which is mounted on the lower wall or sill 22 of the window. Pad 44, which is the same as pad 32, is secured to plate 42, for instance, by cementing, and it serves a purpose identical to the purpose of pad 32. Depending member 46 structurally and functionally corresponds to member 30, and fits within the lower window slot as shown in FIGURE 2.

A plurality of pegs 48 are secured to the tubular body 24, and they project laterally therefrom and are at a slight angle to the longitudinal axis of the body 34. This is to cause the elongate objects 50 carried by the pegs to slide toward the crotch formed at the juncture of pegs 48 and the adjacent surface of the main body 24.

An auxiliary strap 52 formed of elastic material has a loop 54 at one end and a hook 56 at the opposite end. The loop is adapted to be placed around the upper end of body 24, while the hook is made of a dimension to frictionally embrace the shank of screw 34. In this way, the strap 52 may be pulled over the objects 50 to hold them in place on unit 14.

FIGURE 3 discloses a modification of the rack unit. Rack unit 14a distinguishes from rack unit 14 in two ways. The two plates 26a and 42a are flat instead of curved, and screw 34a is operated in a different way. Screw 34a fits in the bore of the tubular main body 24a, but it is moved inwardly and outwardly thereof by rotation of nut 28a. The nut 28a is rotatively connected, for instance, by collar 58 rotatable in an internal annular groove in the bore of body 24a, whereby upon rotation of the nut 28a the screw 34a is moved inwardly and outwardly of the body 24a. Locknut 38a on screw 34a serves a purpose identical to locknut 38.

FIGURE 4 shows another modification in unit 14b. Unit 14b is the same as unit 14a except that a swivel is used at the lower end thereof, the swivel 40b being essentially the same as swivel 40. A further distinction is found in the way that screw 34b is connected to the body 24b. The bore in the body is internally threaded, and screw 34b is threadedly connected directly thereto. Locknut 38b maintains the screw in a selected, adjusted position. As shown in FIGURE 4, the locknut is carried by the screw and engages the lower end of the body 24b.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For mounting in a window opening, a rack comprising a vertical tube, a head on the upper end of said tube engageable beneath the upper wall of the opening, a nut fixed in the lower end portion of the tube, a screw threadedly mounted in said nut and depending therefrom, a foot removably mounted on the lower wall of the opening, said foot including a base plate and an upstanding socket-type bearing thereon, a ball on the lower end of the screw journaled in said bearing, a cylindrical head on the lower portion of the screw for manually turning same for clamping the assembly in the opening, article supporting pegs on the tube, and means for retaining articles on said pegs, said means including an elastic strap mounted vertically on the tube with the articles therebetween, a loop on the upper end of the strap encircling the tube above the pegs, and a hook on the lower end of the strap adapted to receive and bind on the screw for tensioning said strap and adjustably anchoring same to said screw.

2. For mounting in a window opening, a rack comprising a vertical tube, a head on the upper end of said tube engageable beneath the upper wall of the opening, an adjusting nut rotatably secured on the lower end portion of the tube, a screw threaded through the adjusting nut and extending into the tube, a foot on the lower end of the screw engageable on the lower wall of the opening, said adjusting nut providing means for clamping the assembly in the opening, a lock nut for the adjusting nut threaded on the screw, vertically spaced article supporting pegs on the tube, and means for retaining articles on said pegs, the last named means comprising an elastic strap mounted vertically on the tube in opposed relation thereto with the articles therebetween, a loop on the upper end of said strap encircling the upper portion of the tube, and a hook on the lower end of the strap adapted to receive and bind on the screw for tensioning said strap and adjustably anchoring said lower end thereof to said screw.

References Cited in the file of this patent

UNITED STATES PATENTS

| | | |
|---|---|---|
| 1,172,937 | Butcher | Feb. 22, 1916 |
| 2,461,897 | Hopkins | Feb. 15, 1949 |
| 2,535,564 | Campbell | Dec. 26, 1950 |
| 2,536,293 | Koses | Jan. 2, 1951 |
| 2,549,712 | Schwartz | Apr. 17, 1951 |
| 2,764,332 | Lemley | Sept. 25, 1956 |
| 2,797,851 | Leake | July 2, 1957 |